US005468941A

United States Patent [19]

Sasaki

[11] Patent Number: 5,468,941

[45] Date of Patent: Nov. 21, 1995

[54] MONEY PROCESSING APPARATUS HAVING TIMER MEANS

[75] Inventor: Kazuhito Sasaki, Tokyo, Japan

[73] Assignee: Kabushiki Kaisha Toshiba, Kawasaki, Japan

[21] Appl. No.: 274,683

[22] Filed: Jul. 14, 1994

[30] Foreign Application Priority Data

Jul. 16, 1993 [JP] Japan .................................... 5-176534

[51] Int. Cl.$^{6}$ ...................................................... G06F 17/00

[52] U.S. Cl. ............................... 235/379; 902/11; 902/12; 902/15; 209/534

[58] Field of Search ................................. 235/379; 902/9, 902/10, 11, 12, 13, 15; 209/534

[56] References Cited

U.S. PATENT DOCUMENTS 4,473,157 9/1984 Hirose et al. ......................... 902/11 X
4,690,268 9/1987 Ueshin ................................... 198/399
4,825,378 4/1989 Yuge ...................................... 364/478

FOREIGN PATENT DOCUMENTS 5936052 2/1984 Japan .

*Primary Examiner*—Donald Hajec
*Assistant Examiner*—Michael G. Lee
*Attorney, Agent, or Firm*—Cushman Darby & Cushman

[57] ABSTRACT

A memory processing apparatus according to the present invention includes a function for feeding money one by one, a function for discriminating denominations of the money received from the feeding function, a function for storing the money for each of the denominations discriminated by the discriminating function, a function for producing present time and date, setting predetermined time and date, and outputting a signal when the present time and date coincide with the predetermined time and date respectively, and a function for removing the money from the storing function in response to the signal output from the producing function and forming a bundle of a predetermined number of money.

9 Claims, 3 Drawing Sheets

| 61 DATE OR DAY OF WEEK | 62 TIME | 63 DENOMINATIONS | 64 AMOUNT |
|---|---|---|---|
| 65 EVERY DAY | 10:00 | 1000YEN | 5 BUNDLES OF 100 NOTES |
| 66 EVERY TUESDAY | 16:00 | 10000YEN | 20 BUNDLES OF 100 NOTES |
| 67 JULY 16 | 16:00 | ALL OF DENOMINATIONS | AS MANY AS POSSIBLE |

| | 61 | 62 | 63 | 64 |
|---|---|---|---|---|
| | DATE OR DAY OF WEEK | TIME | DENOMINATIONS | AMOUNT |
| 65 | EVERY DAY | 10:00 | 1000YEN | 5 BUNDLES OF 100 NOTES |
| 66 | EVERY TUESDAY | 16:00 | 10000YEN | 20 BUNDLES OF 100 NOTES |
| 67 | JULY 16 | 16:00 | ALL OF DENOMINATIONS | AS MANY AS POSSIBLE |

MONEY PROCESSING APPARATUS HAVING TIMER MEANS

BACKGROUND OF THE INVENTION

1. Field of the Invention

The present invention relates to a money processing apparatus for discriminating between denominations of paper moneys supplied one by one, storing the paper money for each of the denominations, bundling the paper money automatically at a preset time to keep the bundled paper money, and unloading the bundled paper money when the need arises.

2. Description of the Related Art

For example, as shown in U.S. Pat. No. 5,247,159 (published on Sep. 21, 1993), a conventional money processing apparatus includes a circulating paper money receipt/payment unit for receiving paper money and paying out the received paper money and a paper money bundling unit, coupled to the circulating paper money receipt/payment unit, for bundling a bundle of paper money. In this apparatus, paper money stored in a keeping box provided in the paper money receipt/payment unit is bundled in response to an instruction of an operator given from a console panel of the money processing apparatus.

The conventional money processing apparatus, however, has the following drawback. An operator has to always check the number of paper moneys stored in the keeping box in order to instruct the paper money bundling unit to perform a bundling operation. And the money processing apparatus has to form a bundle of money and output it. Therefore, the apparatus has another drawback which the operator sometimes forget or be late for above business.

SUMMARY OF THE INVENTION

An object of the present invention is to provide a money processing apparatus capable of automatically forming a small bundle of money, without confirming the number of coins or notes stored in a storing means, thereby greatly reducing a labor of forming a bundle of money.

To attain the above object, there is provided a money processing apparatus comprising: means for feeding money; means for discriminating denominations of the money fed from the feeding means; means for storing the money for each of the denominations discriminated by the discriminating means; means for producing present time and date, setting predetermined time and date, and outputting a signal when the present time and date coincide with the predetermined time and date respectively; and means for removing the money from the storing means in response to the signal output from the producing means and forming a bundle of a predetermined number of money.

In the money processing apparatus described above, an operator need not instruct the apparatus to form a bundle of money every time, but a bundle of money can be formed in response to an instruction from the time producing means when the present time and date coincide with the predetermined time and date. If once the operator sets necessary programs to the apparatus, a bundle of money can be formed automatically at a predetermined time of a day of the week, without giving any other instructions to the apparatus. It is thus unnecessary to always confirm the number of moneys or the number of bundles of money stored in the storing means, with the result that a labor of forming a bundle of money is reduced greatly.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

A money processing apparatus according to one embodiment of the present invention will now be described, with reference to the accompanying drawings.

Figure 1:
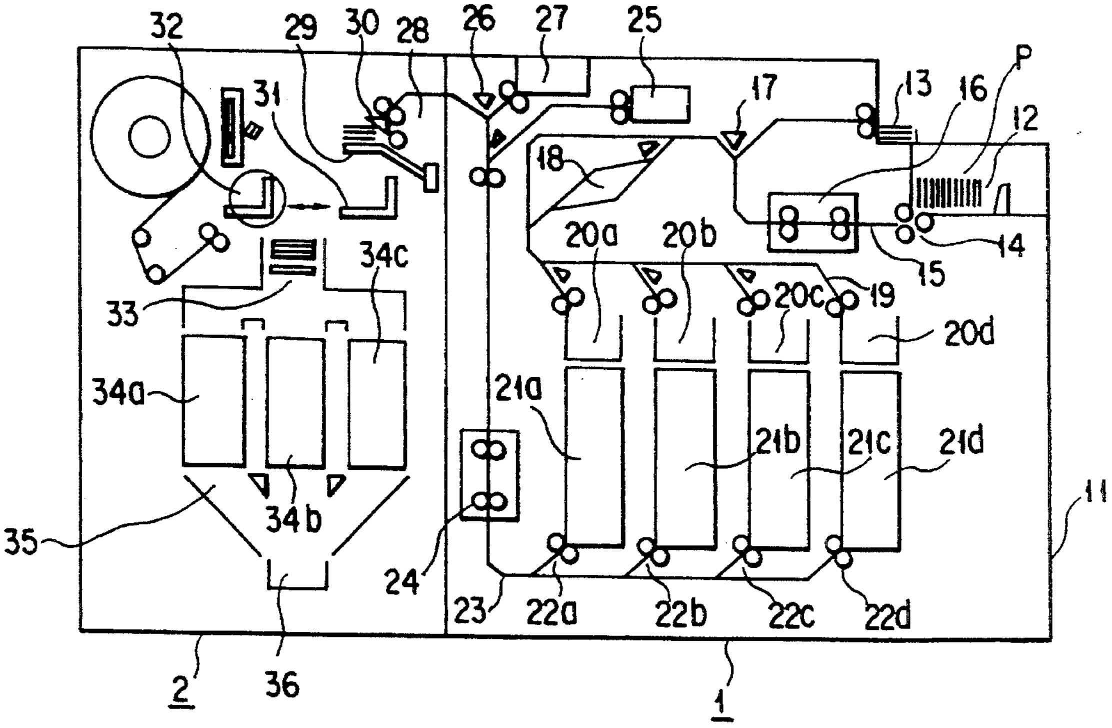
FIG. 1 is a view showing in detail a constitution of a paper money receipt/payment unit and a small bundle of paper money payment unit of a money processing apparatus according to one embodiment of the present invention.
Figure 2:
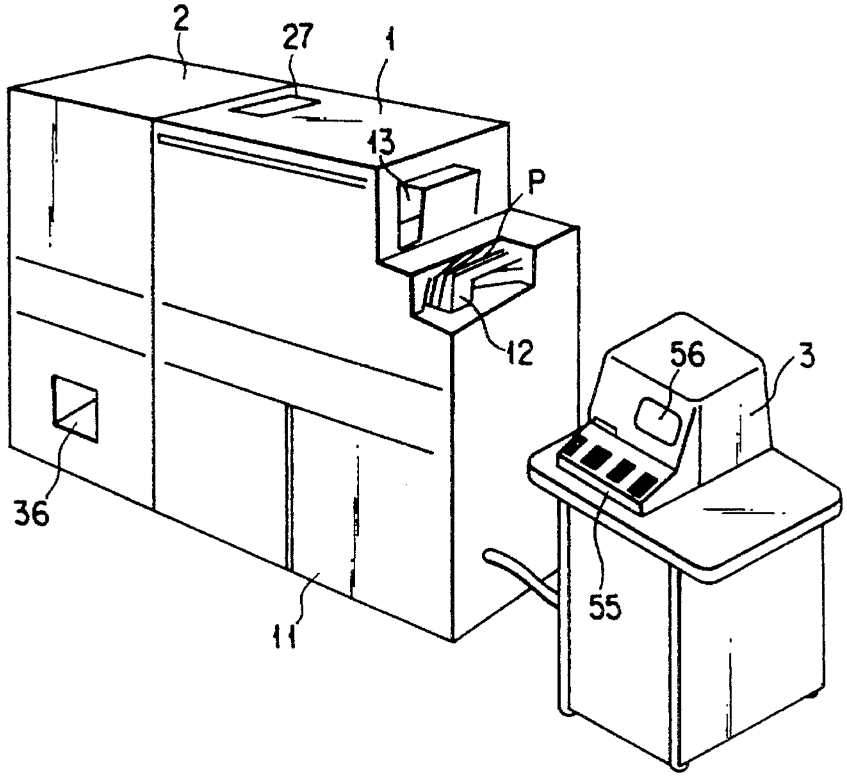
FIG. 2 is a perspective view schematically showing a constitution of the money processing apparatus of FIG. 1.

FIG. 2 schematically shows a constitution of the money processing apparatus according to the present invention. The apparatus includes a paper money receipt/payment unit 1, a small bundle of paper money payment unit 2, and a display operation device 3. These units 1 and 2 are constituted as shown in, for example, FIG. 1. In FIG. 1, an opening 12 for inserting paper money and an opening 13 for rejecting paper money are provided on the upper right side of a main body 11 of the apparatus. The main body 11 includes a paper money take-out device 14 arranged opposite to the opening 12. The paper moneys P stacked one on another at the inlet 12, are taken out one by one, and fed to a take-in carrying path 15.

The paper moneys P carried by the take-in carrying path 15, pass a judging section 16. The judging section 16 judges denominations of the paper money, judges whether the paper money is true or false and undamaged or damaged, and discriminates between the obverse and reverse of the paper money, etc. If the paper money P is judged as abnormal, it is sent to the opening 13. On the other hand, if the paper money P is judged as normal, it is guided to a reversing section 18 by means of a classification gate 17.

The paper moneys P are supplied to a classification carrying path 19 via the reversing section 18, while wrong-sided paper moneys are reversed by the reversing section 18. The paper moneys P are thus classified in accordance with their denominations based on the results of the judging section 16. Under the classification carrying path 19, temporary keeping boxes 20*a* to 20*d* corresponding to the denominations and storing boxes 21*a* to 21*d* corresponding to the boxes 20*a* to 20*d*, are arranged. The classified paper moneys P are temporarily stacked and accumulated in their corresponding temporary keeping boxes 20*a* to 20*d*, and then stored in the storing boxes 21*a* to 21*d*.

The storing boxes 21*a* to 21*d* are provided with paper money take-out devices 22*a* to 22*d*, respectively. The paper moneys P are removed one by one from the storing boxes 21*a* to 21*d* by the paper money take-out devices 22*a* to 22*d* and supplied to a payment-money carrying path 23.

The paper moneys P are carried by the payment-money carrying path 23 via a judging section 24 at which their denominations, thicknesses, carrying states, etc. are judged. If the paper moneys P are judged as abnormal by the judging section 24, they are supplied to an opening 25 for paying out reject money. If the paper money P are judged as normal, they are guided to an opening 27 for paying out the paper money, by a classification gate 26 in the payment mode designated by the display operation device 3, and they are guided to a bundling-money carrying path 28 disposed in the small bundle of paper money payment unit 2 in the bundling mode designated thereby.

The bundling-money carrying path 28 leads to a backup body 29 in which the paper moneys P carried by the path 28 in the bundling mode are temporarily accumulated. A separator 30 for separating the paper moneys P every 100 sheets, is provided above the backup body 29. A group of 100 paper moneys is stacked in a carrier 31, and carried to a bundling section 32 by the carrier 31. In the bundling section 32, the 100 paper moneys are bundled.

After bundling, the carrier 31 is returned to the original position under the backup body 29 to drop the bundled paper moneys (small bundle) to a classification chute 33. Bundle storing boxes 34*a* to 34*c* for storing bundles of paper moneys for each of the denominations, are arranged under the classification chute 33, and a bundle unload chute 35 and a bundle unload opening 36 are arranged under the bundle keeping boxes 34*a* to 34*c*. When payment of bundles of paper moneys is indicated by the display operation device 3, the paper moneys stored in the bundle keeping boxes 34*a* to 34*c* are unloaded from the bundle unload opening 36.

Figure 3:
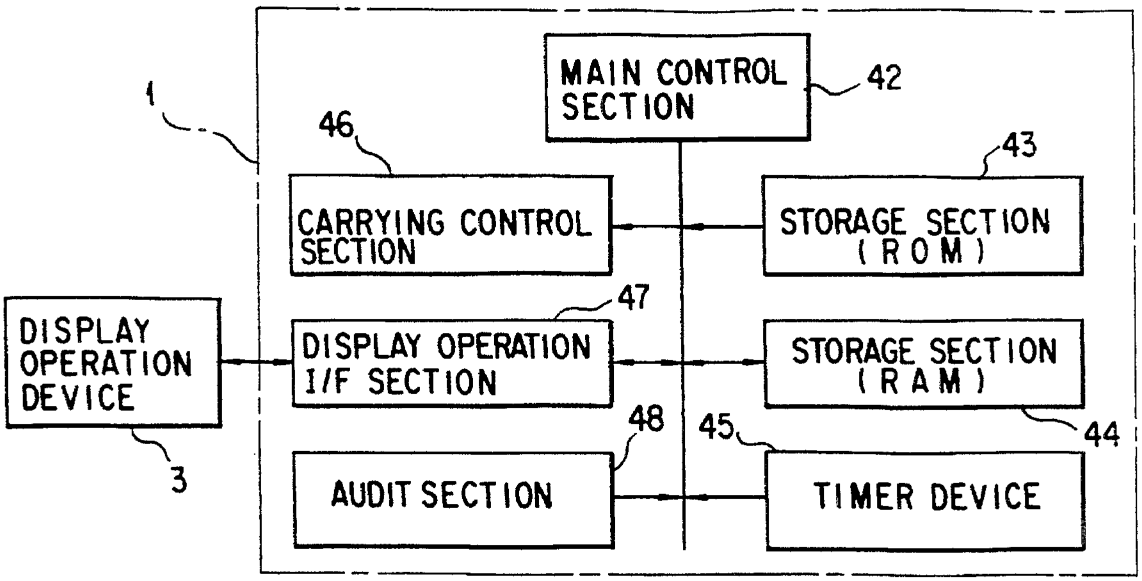
FIG. 3 is a block diagram showing a constitution of a control unit for controlling the paper money receipt/payment unit and small bundle of paper money payment unit.
Figure 4:
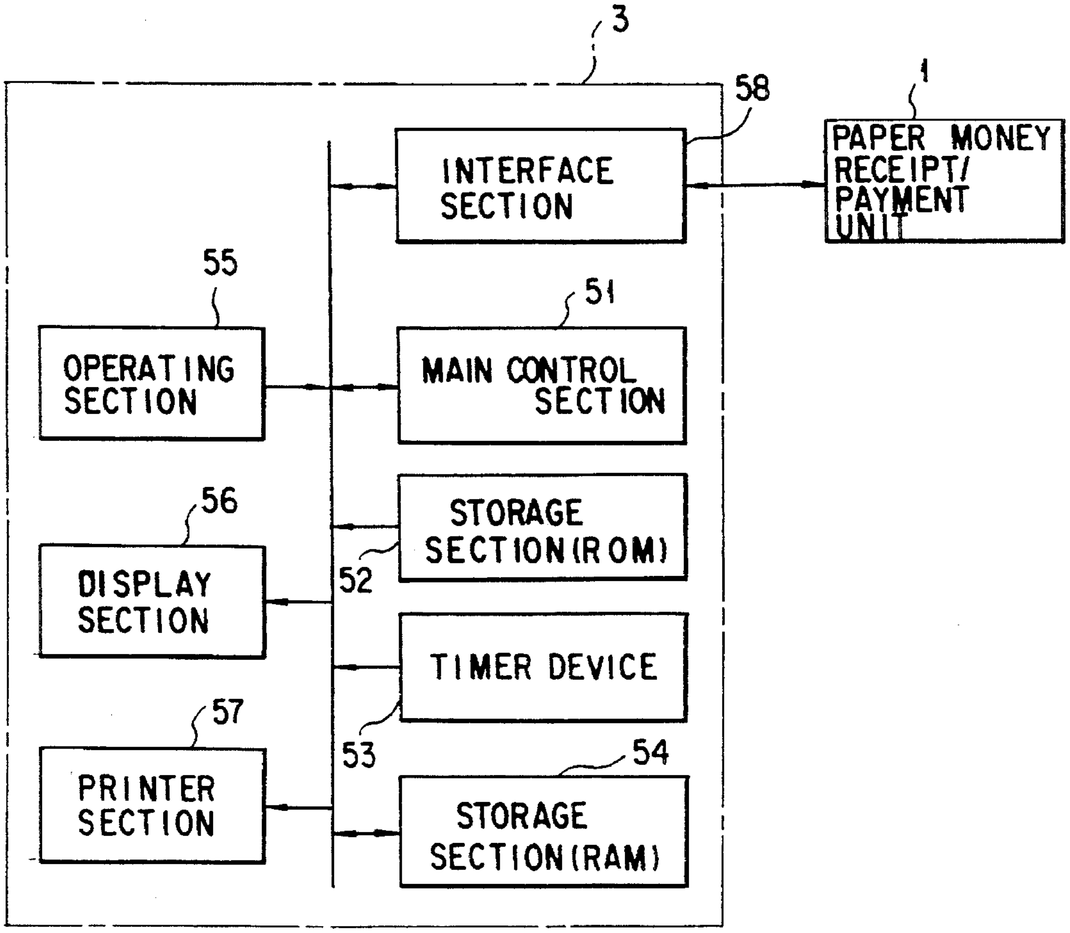
FIG. 4 is a block diagram showing a constitution of a display operation unit.

FIG. 3 is a block diagram showing a constitution of a control device for controlling the paper money receipt/payment unit 1 and small bundle of paper money payment unit 2, and FIG. 4 is also a block diagram showing a constitution of the display operation device 3.

In FIG. 3, the control device is included in the paper money receipt/payment unit 1 and constituted mainly by a main control section 42, and the control device controls an operation of the small bundle of paper money payment unit 2. The main control section 42 has a CPU or the like for controlling the whole apparatus.

The control device is also constituted by a storage section (e.g., ROM) 43 for storing control programs and the like of the main control section 42, a storage section (e.g., RAM) 44 for storing various items of data such as collected processing data, a timer device 45 for measuring and indicating time, a carrying control section 46 for controlling the carrying paths and classification gates, a display operation interface (I/F) section 47 to which the display operation device 3 is connected, and an audit interface section 48 to which the judging sections 16 and 24 are connected.

According to the embodiment shown in FIG. 3, the timer device 45 is included in the control device of the paper money receipt/payment unit 1. However, as shown in FIG. 4, it can be included in the display operation device 3.

In FIG. 4, the display operation device 3 includes a main control section 51 constituted by a CPU or the like for controlling the entire apparatus, a storage section (e.g., ROM) 52 for storing control programs of the main control section 51, a timer device 53 for indicating and measuring time, a storage section (e.g., RAM) 54 for storing various items of data, for example, data of quantity of stored sheet in the stored boxes 21*a* to 21*d*, an operating section 55 such as a keyboard, a display section 56, a printer section 57, and an interface section 58 for communicating data with the paper money receipt/payment unit 1. The timer device 53 can be provided in the control section shown in FIG. 3.

An operation of the money processing apparatus having the above constitution will now be described.

First an operator selects a bundling time setting mode by the display operation device 3 to set a day of the week and time when paper moneys are bundled. The set day and time are transferred to the paper money receipt/payment unit 1 through the interface section 58 of the display operation device 3 and the interface section 47 of the unit 1, and stored in the storage section 44.

Figures 5, 6:
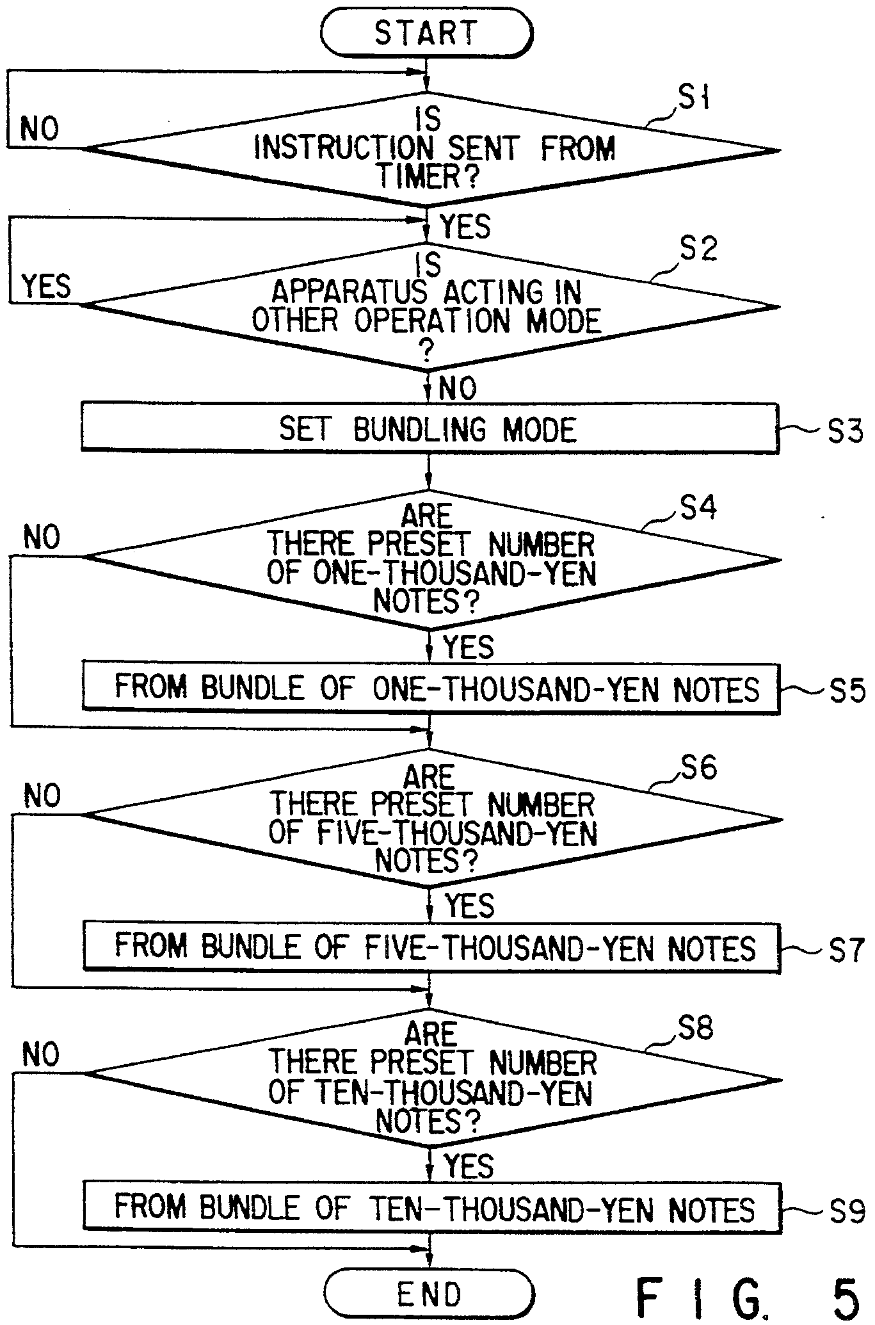
FIG. 5 is a flowchart for forming a bundle of paper money in the money processing apparatus according to the embodiment of the present invention.
FIG. 6 is a table showing examples of setting a timer in the money processing apparatus according to the embodiment of the present invention.

FIG. 6 is a table showing how to set the timer device of the above-described money processing apparatus of the present invention. This table shows day and day of week 61, time 62, denomination 63, and amount 64. For example, in the first row 65, five bundles of 100 one-thousand-yen notes are formed automatically at 10 a.m. every day. In the second row 66, twenty bundles of 100 ten-thousand-yen notes are formed automatically at 4 p.m. every Tuesday. In the third row 67, all of denominations notes is formed automatically at 4 p.m. on July 16 as many as possible.

The main control section 42 of the unit 1 compares the bundling time stored in the storage section 44 with time indicated by the timer device 45. When both the times coincide with each other, the time outputs a signal. And, the paper moneys P stored in the storing boxes 21*a* to 21*d* of the unit 1, are removed through the paper money take-out devices 22*a* to 22*d* in the bundling mode, while the control section 42 judges that the unit 1 is not operated.

As described above, the removed paper moneys P are fed to the bundling section 32 of the unit 2 to bundle the paper money P, for example, every 100 sheets, and the bundled moneys are stored in the bundle keeping boxes 34*a* to 34*c* according to their respective denominations.

For example, if the storing boxes 21*a*, 21*b*, and 21*c* are set for one-thousand-yen notes, five-thousand-yen notes, and ten-thousand-yen notes, respectively, and the bundle keeping boxes 34*a*, 34*b*, and 34*c* are set for one-thousand-yen notes, five-thousand-yen notes, and ten-thousand-yen notes, respectively, the notes can be removed, bundled, and stored in accordance with the respective denominations. The denominations corresponding to the storing boxes and bundle keeping boxes can be set so that an operator can easily handle the display operation device 3.

If the money papers stored in the storing boxes 21*a* to 21*d* are insufficient to be bundled, they are not removed from the boxes. Furthermore, if, while the apparatus is operating in the bundling mode, an operator operates the apparatus in the other operation mode, he or she is able to depress a stop key of the operating section 55 of the device 3 to give an instruction to stop the apparatus. This instruction is sent to the main control section 42 via the interface section 47. The main control section 42 releases the bundling mode when the bundling operation is completed.

FIG. 5 is a flowchart for bundling paper moneys in the foregoing money processing apparatus. The flowchart is based upon a premise that a bundling operation is carried out only when there are sufficient paper moneys for each denomination and the timer device gives an instruction to bundle the paper moneys. First it is determined whether an instruction is sent from the timer device (step S1). If YES in the step S1, the apparatus are determined whether the apparatus acts in other operation mode (S2). If YES in the step S2, the apparatus is preset in the bundling mode (SB). And, it is determined whether a preset number of one-thousand-yen notes are stored (step S4). If YES in the step S2, the one-thousand-yen notes are bundled by the number indicated by the timer device (step S5). It is then determined whether a preset number of five-thousand-yen notes are stored (step S6). If YES in the step S4, the five-thousand-yen notes are bundled by the number indicated by the timer device (step S7). Finally it is determined whether a preset number of ten-thousand-yen notes are stored (step S8). If YES in the step S6, the ten-thousand-yen notes are bundled by the number indicated by the timer device (step S9).

The above process can be applied to hard money of one-yen coins, ten-yen coins, one-hundred-coins, and the like.

As described above, in the money processing apparatus of the present invention, since a small bundle of paper money can be performed automatically at a preset time of an arbitrary day of the week, an operator of the apparatus need not confirm the number of paper moneys stored in the storing boxes or the number of bundles of paper moneys stored in the bundle keeping boxes, resulting in great decrease in labor of bundling the paper money.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A money processing apparatus comprising:

means for feeding money one by one;

means for discriminating denominations of the money fed from the feeding means;

means for storing the money for each of the denominations discriminated by the discriminating means;

means for setting a predetermined time and date;

means for producing present time and date, and producing a signal when the present time and date coincide with said predetermined time and date respectively; and means for removing the money from the storing means in response to the signal produced from the producing means and forming a bundle of a predetermined number of money.

2. A money processing apparatus according to claim 1, further comprising means for determining whether the money received from the receiving means is true or false and undamaged or damaged, and discriminating between an obverse and a reverse of the money.

3. A money processing apparatus according to claim 2, further comprising means for reversing one of the obverse and the reverse of the money, which is judged as wrong by the determining means.

4. A money processing apparatus according to claim 1, further comprising means for judging whether an amount of money corresponding to each of the denominations classified by the discriminating means is appropriate and, when the amount of money is inappropriate, preventing forming means from forming a bundle of the money.

5. A sheet processing apparatus comprising:

means for feeding sheet one by one;

means for discriminating denominations of the sheeting fed from the feeding means;

means for storing the sheet for each of the denominations discriminated by the discriminating means;

means for setting a predetermined time and date;

means for producing present time and date, and producing a signal when the present time and date and said predetermined time and date coincide with each other;

means for removing the one of paper money and hard money from the storing means in response to the signal produced from the producing means and forming a bundle of a predetermined number of one of sheet; and means for determining whether a number of one of paper money and hard money corresponding to each of the denominations discriminated by the discriminating means is appropriate and, when the number is inappropriate, preventing forming means from forming a bundle of the one of sheet.

6. A money processing apparatus according to claim 5, further comprising:

means for storing data of time and date of forming a bundle, and data of the denominations and the quantity of the sheet to be formed the bundle.

7. A money processing apparatus according to claim 6, wherein the producing means includes means for comparing the time stored by storing means with present time.

8. A money processing apparatus according to claim 6, wherein the determining means whether a quantity of the stored sheet is adequate in response to the quantity data of the sheet to be formed the bundle.

9. A money processing apparatus comprising:

means for feeding money;

means for storing the money received by the feeding means;

means for setting a predetermined time and date;

means for producing present time, and producing a signal when the present time coincide with said predetermined time; and means for removing the money from the storing means in response to the signal produced from the producing means and forming a bundle of a predetermined number of money.

* * * * *